Patented Aug. 18, 1953

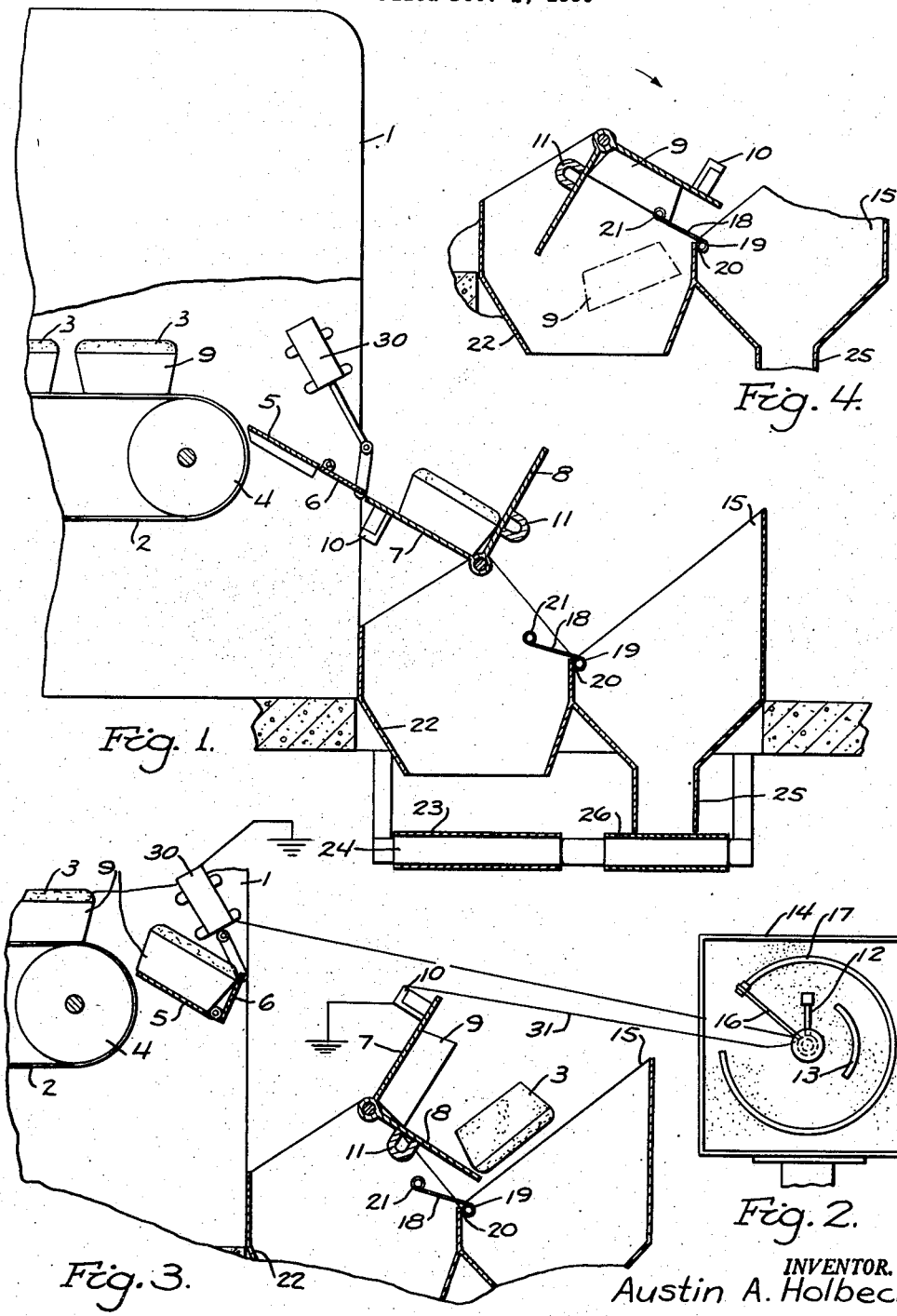
Aug. 18, 1953 — A. A. HOLBECK — 2,649,058
APPARATUS FOR UNLOADING CONTINUOUS BAKING OVENS
Filed Dec. 1, 1950
INVENTOR.
Austin A. Holbeck
BY
Barnes, Kisselle, Laughlin & Raisch
Attorneys.

2,649,058

UNITED STATES PATENT OFFICE 2,649,058

APPARATUS FOR UNLOADING CONTINUOUS BAKING OVENS

Austin A. Holbeck, Detroit, Mich.

Application December 1, 1950, Serial No. 198,660

6 Claims. (Cl. 107—57)

1

This invention relates to apparatus for unloading continuous baking ovens. These continuous baking ovens may be heated by infrared rays or any other suitable source of heat. It is the object of the present invention to provide an improvement on the machine for unloading continuous baking ovens described and claimed in my application Serial No. 187,058, filed September 18, 1950. In this application the unloading machine employs an electromagnet or magnets to hold the pans on the revolving shelf while the pans are being vibrated and the bread is being unloaded and dropped into the bread receiving hopper. When the unloader with the pans rotates to a position above the pan hopper the electromagnet is de-energized and the pan separates from the revolving shelf.

It is the object of the present invention to provide an apparatus that does away with the use of an electromagnet and substitutes a permanent magnet. This is a cheaper and more desirable apparatus and less open to service difficulties. The electromagnet is undesirable because it requires direct current and in most locations this can only be had by providing an expensive rectifier.

Referring to the drawing:

Fig. 1 is a fragmentary and broken away view of the baking oven showing the unloading apparatus in vertical section.

Fig. 2 is an elevation of the electric control switch.

Fig. 3 is a view similar to Fig. 1 but showing the apparatus in a different position in which the shelf has been revolved to a position to unload the bread and the gate has been raised to receive the bread that slides down the inclined hearth from the oven.

Fig. 4 shows a vertical section of the revolving shelf and the hoppers with the pan being disengaged from the shelf.

It will be understood that a large number of loaves are unloaded from the oven simultaneously. In my aforementioned application Serial No. 187,058, four groups of loaves of four loaves in each group are shown, but usually there will be five groups of four loaves making twenty loaves that slide out of the oven onto the inclined hearth.

The oven is designated 1, the conveyor 2, and the bread 3. The loaves of bread slide off the end of the conveyor where the belt rounds the pulley wheel 4. They slide onto the inclined hearth 5 and when the gate 6 is down as shown in Fig. 1, the loaves slide onto the shelf 7 on the

2 unloader wheel and against the shelf 8 on the unloader wheel and come to rest in the crotch between the two shelves. The bread is contained in pans 9 and these pans, as explained in my prior application, are vibrated by the vibrator 10. When the unloader wheel gets to the position shown in Fig. 3 the pan is held on the shelf 7 by means of the permanent U or horseshoe type magnet 11. This magnet may be one of a series of magnets, but preferably it would be a long magnet that extends the full length of the shelf that is arranged to take quite a large number of loaves, say twenty loaves. The magnet is placed where it is on shelf 8 instead of the shelf 7 so that the magnet will not interfere with the sliding of the pan onto the shelf but on the contrary will pull it onto the shelf 7.

This vibrator 10 is of the well known type having an armature attracted to an electromagnet connected to a suitable source of electric current through the segment 13 in control switch 14. The armature of the vibrator raps against the shelf 10 when the electromagnet is energized by the arm 12 of switch 14 passing over the segment 13. The circuits to the electromagnet are maintained despite the movement of the shelf 7 by means of the conventional brush or commutator and a ring on the shaft on which the shelf 8 turns. It is thought unnecessary to show this construction as it is conventional.

When the unloader wheel reaches the position shown in Fig. 3 the bread 3 is discharged from the pan 9 by reason of the jarring given the pan by means of vibrating the vibrator 10. This vibrator is controlled by the switch arm 12 passing over the segment 13 in the control switch 14. The loaves are discharged into the bread hopper 15 as shown in Fig. 3.

The gate 6 is normally in the raised position as shown in Fig. 3 and is kept in this position by means of the solenoid 30 and the control switch which has the arm 16 passing over the segment 17. The gate is only dropped as shown in Fig. 1 when the arm 16 passes over the gap in the segmental contact member 17. The time the switch arm 12 is passing over the segment 13 the vibrator is in action for a short period while the unloader wheel is turning from the position shown in Fig. 3 to the position shown in Fig. 4, through one-quarter of a turn.

As the unloader wheel turns through substantially another one-quarter of a turn, the pans engage the spring arm catch hooks 18. These have a turned over bead 19 at one end which engage over a supporting rod 20. At the other end is a catch bead 21 which is adapted to engage the edge of the pan 9 as it comes around to the position shown in Fig. 4. As the unloader wheel continues to rotate, from the position shown in Fig. 4, the catch bead 21 will catch over the edge of the pan and pull the pan free from the unloader wheel against the pull of the permanent magnet 11 and the pan will drop, as shown in the dotted lines of Fig. 4, into the pan hopper 22 and the pans may be carried away on the conveyor belt 23 that passes over the pulley 24. The bread slides down through the neck 25 of the bread receiving hopper onto the conveyor belt 26 and is conveyed away. The use of the rolled over edge on the spring catch arm forming bead 21 allows the pan to be caught or hooked. At the same time the pan can easily slide over the edge without being damaged. The spring arm 18 is distorted or bent down as the unloader wheel and the pan continue to rotate, but as soon as the pan has been disengaged from the shelf and dropped off the end of the spring catch arm 18 this arm returns to its straight position.

Positive current is supplied to the segments 13 and 17. When the arm 16 passes over the segment 17 the current is taken to the arm 16 and thence by the broken line shown in Figs. 1 and 2 to the solenoid 30, and thence to ground. No rectifier is necessary because with sixty cycle current there are 3600 pulsations a minute and the gaps are of such short duration that the solenoid will not release the gate by the force of gravity.

With the vibrator a rectifier is required to blot out the current in one direction and the heavy springs in the vibrator act so quickly so as to separate the armature of the vibrator and then the magnetized member pulled back by the armature so as to slap the shelf and cause the vibration. A rectifier and vibrator suitable for this purpose can be purchased from W. S. Tyler Company, Cleveland 14, Ohio. The model V-9 controller and vibrator is well adapted for my purpose.

Current supplied to segment 13 is taken off by the brush on arm 12 and passed along the shaft, whereon the unloader wheel and arms 12 and 16 are supported, to a lead shown at 31 connected to the vibrator controller which includes a rectifier within the vibrator casing 10 shown in Fig. 3.

What I claim is:

1. In apparatus for unloading and depanning bread baked in an oven having an inclined hearth onto which the loaves of bread are delivered in pans from a conveyor operating in the bake oven, and the pans and the bread are detained on the inclined hearth, the combination of a rotating unloader wheel provided with a pair of shelves, one of which is adapted to receive the bread and pans when the shelf registers with the inclined hearth and the bread in the pans is released from detainment on the inclined hearth, the other shelf being angularly spaced from the first mentioned shelf and receiving the bread in the pans in the crotch between the two shelves, a magnet on one of the shelves for holding the pans and the bread when the unloader wheel rotates to a position where the pans and the bread would be disengaged from the crotch between the two shelves by gravity, a vibrator secured to one of the shelves for vibrating the pans and the bread to jar the bread loose from the pans, and means for catching the pans and pulling them loose from the magnetic force of the magnet when the unloader wheel has rotated to a position where the bread has been discharged and where the pans can be dropped.

2. The combination claimed in claim 1 in which the said catching means is a spring arm with a hook on the end.

3. The combination claimed in claim 1 in which the catch means is a spring arm with a rolled over bead on the end of the spring arm to catch the edge of the pans and pull them free from the magnetic force.

4. The combination claimed in claim 1 in which the magnet is a permanent magnet.

5. The combination claimed in claim 4 in which the permanent magnet is located on the shelf that is angularly spaced from the first mentioned shelf.

6. The combination claimed in claim 1 with a pivoted gate controlled by a solenoid at the lower end of the inclined hearth and a rotating switch arm in combination with a pair of conductor segments and electrical connections for furnishing electrical energy and controlling the solenoid and gate and the vibrator.

AUSTIN A. HOLBECK.

References Cited in the file of this patent

UNITED STATES PATENTS

| Number | Name | Date |
|---|---|---|
| 1,473,996 | McGarry | Nov. 3, 1923 |
| 1,739,995 | Turner | Dec. 17, 1929 |
| 2,037,808 | MacFarlane | Apr. 21, 1936 |
| 2,462,021 | Harker | Feb. 15, 1949 |